June 9, 1936.  W. H. HARRISON ET AL  2,043,539
CAMERA
Filed Nov. 27, 1934
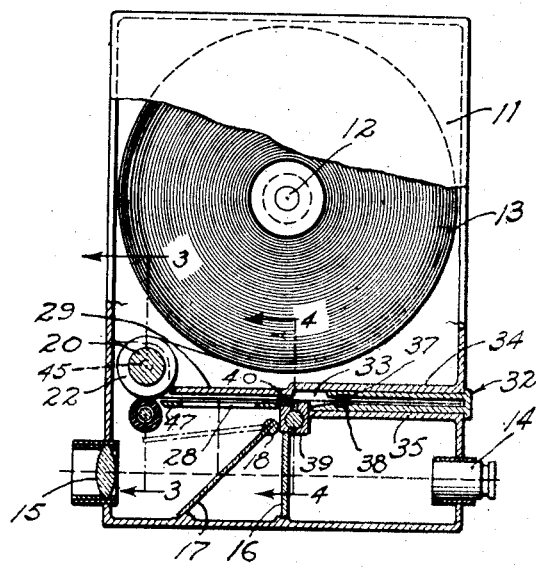
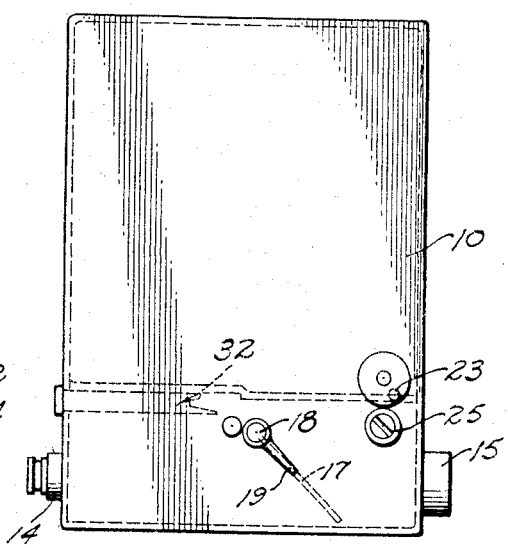
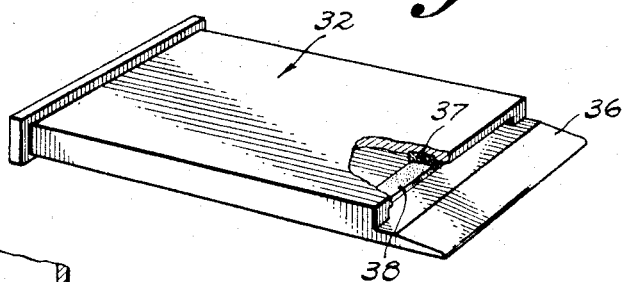
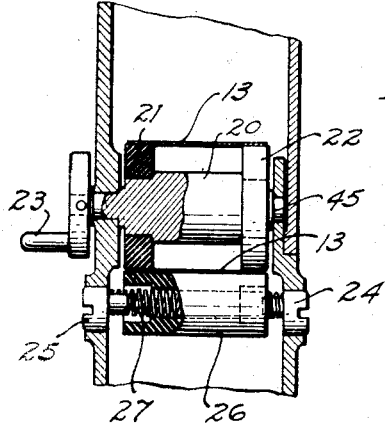
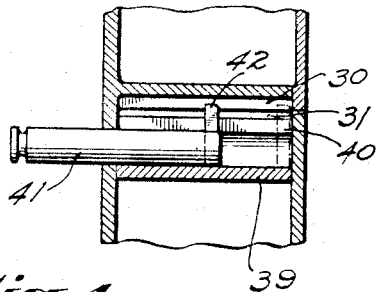
INVENTOR
William H. Harrison, and
Edward C. Harrison.
BY
Robert W. Fulwider
ATTORNEY Patented June 9, 1936

2,043,539

UNITED STATES PATENT OFFICE 2,043,539

CAMERA

William H. Harrison and Edward C. Harrison, Los Angeles, Calif.

Application November 27, 1934, Serial No. 754,990

12 Claims. (Cl. 95—31)

Our invention relates broadly to cameras and particularly to that type of camera adapted for making photographic records direct on positive paper, although as will become apparent, the apparatus herein described is not limited to that use, but is suitable for any photographic work.

Such a camera is exceptionally valuable in identification work where it becomes necessary to produce a great number of photographs at a low cost and as rapidly as possible, such for example as are used in criminal identification, passports and the like, and if satisfactory results can be obtained without the necessity of first making a negative and then printing to a positive film, an obvious saving in time and money is effected.

It is therefore a major object of our invention to provide a camera suitable for making individual photographs direct on positive paper which is simple and durable, and at the same time highly efficient. Heretofore direct positive records have been made with cameras provided with a prism or mirror placed in front of the lens in order to correct for the left to right reversal of the image. However, this system is objectionable for the reason that the camera must be operated in an awkward and non-directional manner. In the present invention this correction is accomplished simply and effectively by inverting the image top for bottom behind the lens by the use of an angular mirror, which allows the camera to be operated directionally, and also allows the use of a directional finder.

Another object of the invention is to provide a means for daylight unloading of individual photographic records without any danger of fogging the unexposed film in the camera, and without the necessity of removing the entire reel of film. As will be apparent, this feature of our camera is a decided advancement in the art and one that has application to many types of cameras.

A further object is to provide a simple method of identifying each photograph as it is removed from the camera and a novel type of light-tight container for holding the film removed.

In this type of camera, where the individual records are to be removed after exposure, it is essential that a feed mechanism be supplied that will give positive motion to the film without damaging it. This we have accomplished by the novel combination of feed roller and pressure roller hereinafter described, which eliminates the necessity of a pulling or take-up means in the film receiving container.

In photographing living objects, particularly where the object is not overly anxious to be photographed, considerable difficulty is experienced in focusing and maintaining a good focus by the usual type of finder. It is therefore an additional object of our invention to provide a directional finder that eliminates this difficulty.

Other objects and advantages will become apparent from the following description of our invention and from the drawing accompanying the same, in which:

Fig. I is a side elevation of the camera partly cut away and partly in section.

Fig. II is a side elevation of the camera facing the other way.

Fig. III is a vertical section taken at 3—3 in Fig. I.

Fig. IV is a vertical section taken at 4—4 in Fig. I.

Fig. V is a perspective of the film container with a portion broken away.

Referring now to the drawing, and particularly to Figs. I and II, the numeral 10 designates a closed box or casing which is made of any suitable material and is provided with a removable sidewall or cover 11. Mounted within the casing 10, and preferably in the upper portion thereof, is a spindle 12, upon which a roll of light sensitive film 13 is mounted for rotation with the spindle 12. In the rear wall of the casing 10 and near the base thereof, an eyepiece 14 is provided to serve as a finder, and in the opposite or front wall of the casing 10, a suitable lens 15 is located, its directional axis coinciding with that of the eyepiece 14. Substantially midway between the eyepiece 14 and the lens 15, a ground glass 16 is mounted in an upstanding position. Adjacent the ground glass 16 and between it and the lens 15 is a movable mirror 17 pivoted on a horizontal pin 18 mounted between the two sidewalls of the casing 10. Fast to one end of pin 18 is an arm 19 on the outside of the sidewall of casing 10 which is adapted to be moved manually to rotate the mirror 17 about the axis of the pin 18 from the full line position shown in Fig. I, where it intercepts the light rays passing through the lens 15 and deflects them from their horizontal path into a vertical path, to the dotted line position shown in Fig. I, in which position it allows free passage of the light rays from lens 15 to ground glass 16 and thence to eyepiece 14.

Rotatably mounted on a horizontal pin 45 extending between the sidewalls of the casing 10 and spaced near the front wall thereof above the lens 15 is a feed roller 20 provided with raised peripheral bands 21 and 22 of resilient material such as rubber, or the like. These bands 21 and 22 are preferably spaced apart so that they will grip the edges of the film as it passes over the feed roller 20, and in the preferred form of our invention, as illustrated, they are fastened at each end of the feed roller 20, so as not to contact the area of film to be exposed. The pin 45 to which the feed roller 20 is fastened, extends through one sidewall of casing 10 and has a crank 23 fastened to that end thereof, and on the outside of one sidewall of the casing 10 so that the roller 20 can be readily rotated to advance the film.

Spaced immediately below feed roller 20 are two oppositely positioned eccentric pins 24 and 25 set in the sidewalls of casing 10 and extending inwardly therefrom to provide a pair of stub shafts. A cylindrical roller 26 is cored to contain a coil spring 27 which extends through the roller 26 and projects beyond each end thereof. The spring 27 is lined up between the stub shafts 24 and 25 so that they may be inserted in the projecting ends of the spring 27 which thus acts as an axle or rotation shaft for roller 26. The two rollers 20 and 26 are positioned so that roller 26 is in pressure contact with the resilient bands 21 and 22 on roller 20, and by reason of the spring mounting 27, a floating pressure is exerted by roller 26 on roller 20 to insure a constant gripping factor between them irrespective of any minor non-concentricity of the bands 21 and 22. The eccentricity of the pins 24 and 25 upon which the pressure roller 26 is mounted, allow the latter to be raised or lowered at will to provide any desired degree of pressure between it and the feed roller 20.

In threading up the camera the free end of the film 13 is led over the feed roller 20, around and between it and the pressure roller 26, thus being gripped firmly between the latter and the resilient bands 21 and 22 on the feed roller 20. From this point the film is pushed across a horizontal aperture plate 47 having an aperture 28 therein for permitting exposure of the film; lens 15, mirror 17 and aperture 28 being so spaced relative to each other that when mirror 17 is in its lowermost position, the image formed by the lens 15 is reflected up through the aperture 28 onto the film 13, to expose the same. A horizontal guide plate 29 is spaced immediately above aperture plate 47 to facilitate the travel of the film and keep it from buckling as it is pushed across the aperture 28. The exit end of the passage formed by the aperture plate 47 and guide plate 29 is provided with lips 30 and 31, of resilient material such as felt, sponge rubber or the like which effectually close the film passage against light, but give sufficiently to receive the film and allow it to be pushed between and through them into an enlarged passage 33 adapted to hold a film container 32. This latter passage 33 is formed as an elongated recess having an opening or slit in the rear wall of casing 10 and upper and lower parallel plates 34 and 35, the horizontal axis of the passage 33 being coaxial with that of the passage between the guide plate 29 and aperture plate 47.

The passage 33 is provided with a removable film container 32 formed as a flat rectangular boxlike holder open at the inner end. The base of the container 32 projects out beyond the sides and top to provide a shelf-like lip 36 adapted to support the end of the film when the container has been removed from the camera, thus facilitating the marking or identifying of the film. Adjacent the open end of the container 32 are a pair of resilient lips 37 and 38 made of felt or similar material, in contact to effect a light tight opening for the container, but sufficiently resilient and so spaced that they will receive the film as it is pushed into and through them into the interior of the container 32.

Mounted within the casing at the junction between aperture plate 47 and parallel plate 35 is a cored block 39 provided with a vertical slit 40 running the major part of its length. Slidably mounted within the block 39 is a rod 41 having an upstanding knife blade 42 which projects up through the slit 40 and into the passage 33 across the film path. As will be seen in Fig. 4, the rod 41 extends through a light tight opening in the sidewall of the casing 10 and can be grasped at its extending end to be moved longitudinally of the barrel and slit of block 39. The normal position of rod 41 is with the knife blade 42 in its innermost position to the extreme right in Fig. IV as shown by the dotted lines. In this position it is out of contact with the film 13.

In operating the camera, the roll of film 13 is mounted in the casing 10 on spindle 12 and the free end of the film is led over feed roller 20, between roller 20 and pressure roller 26 and across aperture plate 47 as previously described. In this position, the film is ready for exposure, the free end being located at the lips 30 and 31, and an empty container 32 being in place within the passage 33 to receive the film after exposure. The mirror 17 is swung to its upper position by moving handle 19 and the camera is focused on the object to be photographed. With the mirror in this upper position, the image is focused on the ground glass 16 and viewed therethrough the eyepiece 14 which is provided with a red filter to prevent fogging of the film. It will be noted that when the mirror 17 is in its upper or inoperative position that it makes a light-tight shield across the film to prevent fogging from the lens. With this type of finder it will be evident that focusing becomes very simple, particularly for objects inclined to vary their distance from the lens.

When the camera is properly focused, the lever 19 is quickly depressed, throwing the mirror 17 down to its lower position where it will deflect the image onto the film through aperture 28. When the required time for the exposure has elapsed, the mirror is once again raised to prevent further exposure of the film. The handle 23 on feed roller 20 is then turned to rotate the feed roller 20 to push the film, which is gripped between the feed roller 20 and pressure roller 26, through lips 30 and 31 into passage 33, through lips 37 and 38 and into the container 32. When the exposed portion of the film has been entirely fed into the container 32, rotation of the roller is stopped and the rod 41 is pulled outwardly in the barrel of block 39. This motion of the rod 41 causes the knife 42 to travel along the slit 40 across the path of the film 13 and to sever the film transversely at that point, thus separating the exposed record from the balance of the film which is unexposed.

The container 32 may then be removed by pulling it out of the recess 23 and the lips 37 and 38 will effectually seal the container so that no light can reach the exposed but undeveloped record. Due to the fact that lips 30 and 31 also form a light tight connection, no fogging of the unexposed film is possible. The rod 41 is then pushed back into normal position, a new container inserted into the recess 33 and the camera is ready for another exposure.

The exposed record can then be developed and subjected to any of the well-known reversal processes to produce a final positive record of the subject photographed. By this construction it will be seen that the economy of using a film roll of considerable length is possible while still securing individual photographs as exposed without the necessity of waiting until the entire roll is exposed.

While in the preferred form shown we have dispensed with a shutter on the lens as unnecessary, it will be obvious that a shutter may be added if it is desired to use the camera for snapshots. With a shutter on the lens 15, the mirror 17 could be made stationary if a separate finder were used as for example by moving it over out of line with the lens and providing a second aperture or lens in connection with the eyepiece. Also the mirror can be entirely dispensed with if correction is not required. Furthermore, while we favor a container that is insertable in the camera itself, it will be obvious that the container 32 may be made to fasten on the outside of the camera so long as a light-tight connection is established.

These and other modifications in the arrangement of parts and the substitution of equivalent parts for those shown and described can be made without in any way going outside the proper scope of our invention. It is to be understood that according to the law made and provided with respect to patents, we have shown one preferred form of our invention, which is to be taken as illustrative only, and not as limiting the proper scope of our invention as defined by the appended claims.

We claim as our invention:—

1. A camera for making individual photographic records on a film strip which includes: means for exposing a portion of said film strip to produce a photographic record; feed means for advancing said record past the point of exposure; a removable container with resilient lips for receiving said record; means for severing said record from said film strip; and sealing means for preventing exposure of said film strip when said container is removed from said camera.

2. A camera for making individual photographic records on a film strip which includes: means for exposing a portion of said film strip to produce a photographic record; feed means for advancing said record past the point of exposure; a removable container for receiving said record; cutting means for severing said record from said film strip; and resilient sealing means within said camera for preventing exposure of said film strip when said container is removed from said camera.

3. A camera for making individual photographic records on a film strip which includes: means for exposing a portion of said film strip to produce a photographic record; feed means for advancing said record past the point of exposure; a removable container with light tight resilient lips for receiving said record; a transversely movable blade for severing said record from said film strip; and sealing means comprising resilient lips for preventing exposure of said film strip when said container is removed from said camera.

4. A camera for making individual photographic records on a film strip which includes: means for exposing a portion of said film strip to produce a photographic record; and means for advancing said film strip comprising a rotatable feed roller in cooperative relationship with a pressure roller mounted on an axial spring and adapted to rotate in contact with said feed roller.

5. A camera for making individual photographic records on a film strip which includes: means for exposing a portion of said film strip to produce a photographic record; and means for advancing said film strip comprising a cylindrical feed roller having a plurality of resilient bands therearound, and a pressure roller mounted on an axial spring and adapted to rotate in contact with said bands.

6. A camera for making individual photographic records on a film strip which includes: means for exposing a portion of said film strip to produce a photographic record; means for advancing said film strip beyond the point of exposure comprising a cylindrical feed roller having a plurality of resilient bands therearound and a pressure roller adapted to rotate in contact with said bands; movable cutting means for severing said record from said film strip said means being located beyond the point of exposure along the line of travel of said film strip; and means for removing said severed record from said camera without exposing it to light.

7. A camera for making individual photographic records on a film strip which includes: means for exposing a portion of said film strip to produce a photographic record; means for advancing said film strip; means for severing said record from said film strip; and a container comprising a relatively flat walled receptacle with resilient lips at one end thereof for receiving said record.

8. A camera for making individual photographic records on a film strip which includes: means for exposing a portion of said film strip to produce a photographic record; means for advancing said film strip; means for severing said record from said film strip; and a container comprising a light tight receptacle having a protruding lip portion at the entrance end thereof adapted to support a film strip.

9. A camera for making individual photographic records on a film strip which includes: a lens; an angularly positioned mirror behind said lens and adapted to reflect light rays from said lens on to a portion of said film strip to produce a photographic record; means for advancing said film strip past the point of exposure; a removable light tight container for receiving said record; means for severing said record from said film strip; and means within said camera for preventing exposure of said film strip upon removal of said container.

10. A camera for making individual photographic records on a film strip which includes: a vertically positioned lens; an angularly positioned mirror behind said lens and coaxial therewith adapted to reflect light rays from said lens in a vertical direction; a horizontal aperture plate in the path of said reflected rays; means for advancing a film strip across said aperture plate after exposure of a portion thereof; a removable light tight container for receiving said exposed portion of film; and means within said camera for preventing exposure of said film strip upon removal of said container.

11. A camera for making individual photographic records on a film strip which includes: a lens; an angularly positioned mirror behind said lens and adapted to reflect light rays from said lens on to a portion of said film strip to produce a photographic record; means for advancing said film strip past the point of exposure;

upper and lower substantially horizontal partition walls forming a receptacle for a removable container adapted to receive said record; and movable cutting means disposed adjacent the path of travel of said film strip and between the point of exposure thereof and the inner end of said container when the same is inserted in said receptacle.

12. A camera for making individual photographic records on a film strip which includes: a walled casing provided with means for mounting a reel of film in its upper portion; a lens in the lower portion of the front wall of said casing; a horizontal aperture plate provided with an aperture and disposed above and to the rear of said lens; a vertically positioned ground glass disposed behind said lens; a mirror pivotally mounted between said lens and said ground glass and adapted to be swung up against said aperture plate; means for viewing said ground glass; means for advancing said film strip across said aperture plate; a removable container adjacent said aperture plate adapted to receive a portion of said film strip after the same has been advanced across said plate; and means for severing the portion of film received by said container from the balance of said film strip.

WILLIAM H. HARRISON.
EDWARD C. HARRISON.